(12) United States Patent
Fan et al.

(10) Patent No.: US 12,482,295 B2
(45) Date of Patent: Nov. 25, 2025

(54) SYSTEM FOR IMAGE PROCESSING, A METHOD OF FACIAL EXPRESSION DETECTION AND A METHOD OF RECONSTRUCTION IMAGE GENERATION

(71) Applicant: Centre for Intelligent Multidimensional Data Analysis Limited, Hong Kong (CN)

(72) Inventors: Xinqi Fan, Hong Kong (CN); Ali Raza Shahid, Hong Kong (CN); Hong Yan, Hong Kong (CN)

(73) Assignee: Centre for Intelligent Multidimensional Data Analysis Limited, Hong Kong (CN)

( * ) Notice: Subject to any disclaimer, the term of this patent is extended or adjusted under 35 U.S.C. 154(b) by 439 days.

(21) Appl. No.: 17/977,041

(22) Filed: Oct. 31, 2022

(65) Prior Publication Data

US 2024/0169760 A1    May 23, 2024

(51) Int. Cl.
| | |
|---|---|
| *G06V 40/16* | (2022.01) |
| *G06T 3/18* | (2024.01) |
| *G06T 7/20* | (2017.01) |
| *G06V 10/82* | (2022.01) |

(52) U.S. Cl.
CPC ............ *G06V 40/174* (2022.01); *G06T 3/18* (2024.01); *G06T 7/20* (2013.01); *G06V 10/82* (2022.01); *G06V 40/161* (2022.01); *G06V 40/171* (2022.01); *G06T 2207/20084* (2013.01); *G06T 2207/30201* (2013.01)

(58) Field of Classification Search
CPC .... G06V 40/174; G06V 10/82; G06V 40/161; G06V 40/171; G06V 40/176; G06T 3/18; G06T 7/20; G06T 2207/20084; G06T 2207/30201
See application file for complete search history.

(56) References Cited

U.S. PATENT DOCUMENTS

2023/0017508 A1*  1/2023  Dabija .................. G06V 20/40

OTHER PUBLICATIONS

X. Fan, A. R. Shahid and H. Yan, "Facial micro-expression generation based on deep motion retargeting and transfer learning", Proc. 29th ACM Int. Conf. Multimedia, pp. 4735-4739, Oct. 17, 2021. (Year: 2021).*

(Continued)

*Primary Examiner* — Vincent Rudolph
*Assistant Examiner* — Keely Gwynne Yeargin
(74) *Attorney, Agent, or Firm* — MOSER TABOADA

(57) ABSTRACT

A system for image processing, a method of facial expression detection and a method of reconstruction image generation. The system comprises a facial expression extraction module arranged to, upon receiving a source sequence of images representing a predetermined facial expression performed by a sample target, extract a motion of at least one key facial feature of the sample target associated with the predetermined facial expression, and to enhance the detection of the motion including at least one subtle movement of the at least one key facial feature; and a facial expression data analyser arranged to collect facial micro-expression data associated with the predetermined facial expression and the motion including subtle movements of all key facial features of the sample target performing the predetermined facial expression.

18 Claims, 6 Drawing Sheets

(56) References Cited

OTHER PUBLICATIONS

Gong, Enhao, Tianheng Wang and Jing Xiong. "Hidden Emotion Detection through Analyzing Facial Expression." 2013. (Year: 2013).*

Jiang, C., Liu, H., Li, L., and Pan, C., "Attention-Based Self-Supervised Learning Monocular Depth Estimation With Edge Refinement," 2021 IEEE International Conference on Image Processing (ICIP), Anchorage, AK, USA, 2021, pp. 3218-3222. Sep. 19, 2021. (Year: 2021).*

Lei, Ling, Tong Chen, Shigang Li and Jianfeng Li. "Micro-expression Recognition Based on Facial Graph Representation Learning and Facial Action Unit Fusion." 2021 IEEE/CVF Conference on Computer Vision and Pattern Recognition Workshops (CVPRW) (2021): 1571-1580. Jun. 1, 2021. (Year: 2021).*

X.Fan, A.R. Shahid and H.Yan, "Edge-aware motion based facial micro-expression generation with attention mechanism", Elsevier, Pattern Recognition Letters, vol. 162 (Oct. 2022) 97-104. https://doi.org/10.1016/j.patrec.2022.09.010.

* cited by examiner

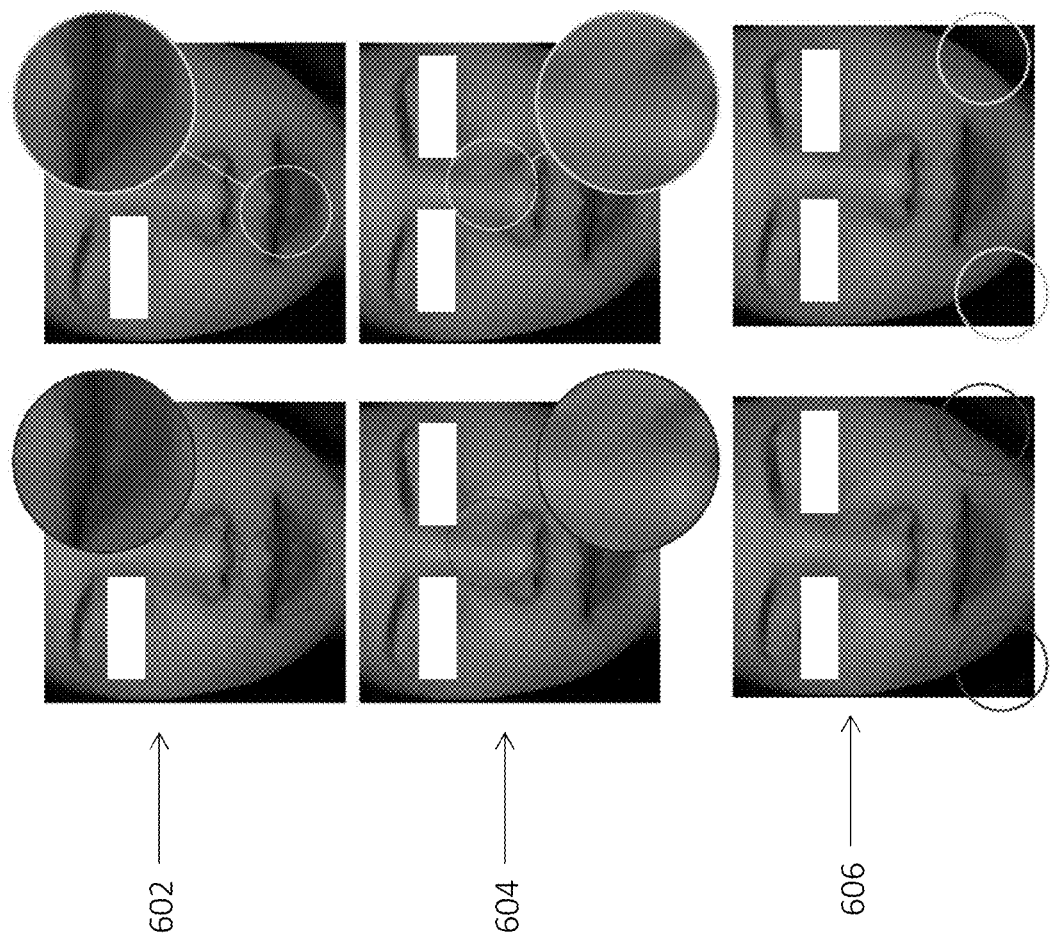

SYSTEM FOR IMAGE PROCESSING, A METHOD OF FACIAL EXPRESSION DETECTION AND A METHOD OF RECONSTRUCTION IMAGE GENERATION

TECHNICAL FIELD

The invention relates to a system for image processing, a method of facial expression detection and a method of reconstruction image generation, and particularly, although not exclusively, to a system and method for generating an image of desire facial expressions.

BACKGROUND

Facial micro-expression (FME) refers to a brief spontaneous facial movement that can demonstrate the genuine emotion of persons when they conceal their true emotions. FME was discovered as micromomentary expressions, or as a nonverbal leakage in the past. Given that FME is spontaneous and uncontrolled, it may provide effective cues for detecting deception.

FME may have a wide range of applications, including national safety, political psychology, and medical care. However, unlike facial macro-expression (FMaE), FMEs are hard to observe by humans who have no dedicated training because of FMEs' short time interval (0.065-0.5 seconds), slight variations, and limited coverage of action areas. Given these difficulties, automatic FME analysis is more challenging than FMaE analysis.

SUMMARY OF THE INVENTION

In accordance with a first aspect of the invention, there is provided a method of facial expression detection, comprising the steps of: receiving a source sequence of images representing a predetermined facial expression performed by a sample target; extracting a motion of at least one key facial feature of the sample target associated with the predetermined facial expression, including enhancing the detection of the motion including at least one subtle movement of the at least one key facial feature; and collecting facial micro-expression data associated with the predetermined facial expression and the motion including subtle movements of all key facial features of the sample target performing the predetermined facial expression.

In an embodiment of the first aspect, the step of extracting a motion of at least one key facial feature of the sample target comprises the step of performing an auxiliary task for predicting edges of the at least one key facial feature in one or more moving regions on a face of the sample target.

In an embodiment of the first aspect, the step of performing an auxiliary task for predicting edges includes generating an edge map associated for estimating facial edges to aid the detection of the at least one subtle movement.

In an embodiment of the first aspect, the step of extracting a motion of at least one key facial feature of the sample target comprises the step of processing the source sequence of images by a deep motion retargeting module including a neural network processing engine.

In an embodiment of the first aspect, the neural network processing engine is arranged to operate in an unsupervised manner.

In accordance with a second aspect of the invention, there is provided a method of reconstruction image generation, comprising the step of: processing the source sequence of images and a static image of a target by the motion retargeting module used in the first aspect; and generating, based on the facial micro-expression data collected from the source sequence of images, a reconstructed sequence of images of the target representing the target performing the predetermined facial expression.

In an embodiment of the second aspect, the deep motion retargeting module comprises a sparse motion estimator arranged to estimate a sparse motion from a selected source frame to a selected target frame by combining a first sparse motion from the selected source frame to an abstract reference frame and a second sparse motion from the abstract reference frame to the selected target frame, wherein the abstract reference frame includes a plurality of keypoints.

In an embodiment of the second aspect, the deep motion retargeting module further comprises a dense motion estimator arranged estimate a dense motion from the selected source frame to the selected target frame represented by a linear combination of sparse motion weighted by masks indicating places of transformation of each of the keypoints.

In an embodiment of the second aspect, the method further the step of generating a warped image representation associated with the reconstructed sequence of images, by multiplying an occlusion map indicating places to be inpainted to the dense motion.

In an embodiment of the second aspect, the method further comprises the step of enhancing the warped image representation using an edge-intensified multi-head self-attention module, including: utilizing warped predicted edge information as a query signal to search edge associated attention weights; and generating the reconstructed sequence of images by focusing on important facial regions associated with the warped predicted edge information to reflect subtle changes of the key facial features.

In accordance with a third aspect of the invention, there is provided a system for image processing, comprising: a facial expression extraction module arranged to, upon receiving a source sequence of images representing a predetermined facial expression performed by a sample target, extract a motion of at least one key facial feature of the sample target associated with the predetermined facial expression, and to enhance the detection of the motion including at least one subtle movement of the at least one key facial feature; and a facial expression data analyser arranged to collect facial micro-expression data associated with the predetermined facial expression and the motion including subtle movements of all key facial features of the sample target performing the predetermined facial expression.

In an embodiment of the third aspect, the facial expression extraction module is arranged to perform an auxiliary task for predicting edges of the at least one key facial feature in one or more moving regions on a face of the sample target.

In an embodiment of the third aspect, the facial expression extraction module is arranged to perform the auxiliary task for predicting edges by generating an edge map associated for estimating facial edges to aid the detection of the at least one subtle movement.

In an embodiment of the third aspect, the facial expression extraction module comprises a deep motion retargeting module including a neural network processing engine for processing the source sequence of images to extract the motion of the at least one key facial feature of the sample target.

In an embodiment of the third aspect, the neural network processing engine is arranged to operate in an unsupervised manner.

In an embodiment of the third aspect, the deep motion retargeting module is further arranged to process the source sequence of images and a static image of a target; and the system further comprises an image generator arranged to generate, based on the facial micro-expression data collected from the source sequence of images, a reconstructed sequence of images of the target representing the target performing the predetermined facial expression.

In an embodiment of the third aspect, the deep motion retargeting module comprises a sparse motion estimator arranged to estimate a sparse motion from a selected source frame to a selected target frame by combining a first sparse motion from the selected source frame to an abstract reference frame and a second sparse motion from the abstract reference frame to the selected target frame, wherein the abstract reference frame includes a plurality of keypoints.

In an embodiment of the third aspect, the deep motion retargeting module further comprises a dense motion estimator arranged estimate a dense motion from the selected source frame to the selected target frame represented by a linear combination of sparse motion weighted by masks indicating places of transformation of each of the keypoints.

In an embodiment of the third aspect, the image generator is arranged to generate a warped image representation associated with the reconstructed sequence of images, by multiplying an occlusion map indicating places to be inpainted to the dense motion.

In an embodiment of the third aspect, the deep motion retargeting module is further arranged to enhance the warped image representation using an edge-intensified multi-head self-attention module, by utilizing warped predicted edge information as a query signal to search edge associated attention weights; and wherein the image generator is arranged to generate the reconstructed sequence of images by focusing on important facial regions associated with the warped predicted edge information to reflect subtle changes of the key facial features.

BRIEF DESCRIPTION OF THE DRAWINGS

Embodiments of the present invention will now be described, by way of example, with reference to the accompanying drawings in which:

FIG. 6 are images showing qualitative study of the method with (the second column) and without (the first column) AEP and EIMHSA modules.

DETAILED DESCRIPTION OF THE PREFERRED EMBODIMENTS

Figure 1:
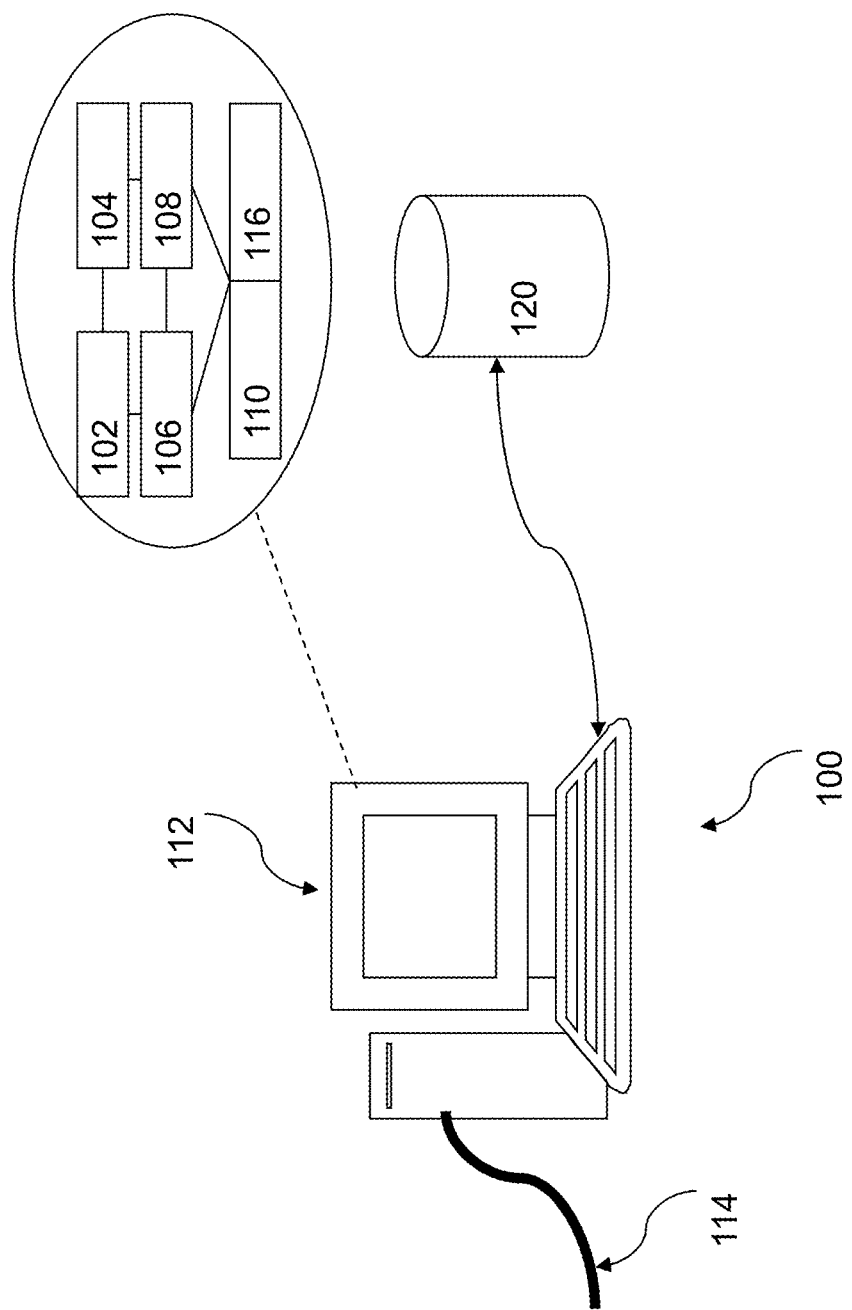
FIG. 1 is a schematic diagram of a computer server which is arranged to be implemented as a system for processing an image in accordance with an embodiment of the present invention.

The inventors devised that the extrapyramidal and pyramidal tracts, which control voluntary and involuntary expressions, are the two different pathways for controlling expressions according to a neuropsychological study. FMEs are manifested when the two paths are active and engaged in a conflict. Thus, eliciting FMEs for database construction is particularly challenging. Several paradigms have been used in the past few years to construct FME databases. Posed FME databases such as USF-HD and Polikovsky's database were presented at early stages. However, they are not spontaneous.

Spontaneous FME databases were built by introducing a neutralization paradigm; subjects were asked to watch strong emotional stimuli while trying to maintain neutral faces. This paradigm has been widely adopted during the creation of several popular databases, including CASME, CASME II, CAS(ME), SMIC, SAMM, and MMEW. However, the neutralization paradigm can differ considerably from how FMEs are elicited in daily life, such as when FMEs are conveyed in interpersonal contacts.

An appropriate paradigm involves eliciting FMEs through mock crime, dictator games, or prisoner's dilemmas, allowing the construction of high ecological databases. MEVIEW is an in-the-wild database selected from online poker game and TV interview video clips. Although these databases helped the development of FME analysis, they are still not large enough for the data-driven deep learning methods. Thus, the performance is hampered by the limitation of small databases. An unprecedentedly large and high ecological validity database CAS(ME) elicited by both mock crimes and neutralization paradigms may be used. The database contains 80 hours of videos with 1,109 FMEs, 3,490 FMaEs, and additional depth information. Although the introduction of CAS(ME) may alleviate the issue of FME's small sample size, annotating such databases remains exceedingly challenging; in particular, annotating a 1-minute video usually takes 30 minutes. Instead of creating new databases from scratch, another way is generating FME samples by leveraging currently available well-calibrated annotations.

Given a source image with a specific FME and a target image, FME generation (FMEG) aims to generate a new sequence based on the target image's identity with the FME of the source sequence. Two main frameworks are used for FMEG: motion based methods and action unit (AU) based methods. In terms of motion based methods, the facial motion is extracted in the source sequence, and transferred to the target image; for AU based methods.

Alternatively, deep learning based methods may use spatial and temporal convolutions to extract high-quality features in short and long videos. For FME recognition, numerous methods extracted appearance features using the local binary pattern from three orthogonal planes or its extensions and variants. In an alternative example, a 3D flow convolutional vertical optical flows, and horizontal optical flows as inputs. However, these approaches only employ a single database, which may not accurately reflect real-world settings in which the testing sequences varied considerably from the trained ones.

Yet alternatively, cross-database evaluation protocols may be used. The inventors emphasized the importance of the optical flow features between the onset and apex frames for cross-database generalization ability; thus, some deep learning based methods using the corresponding inputs may be used. Furthermore, low resolution inputs and shallow architecture models are two critical factors to improve the performance. Although these strategies increase FME spotting and recognition performance, FME analysis continues to be hampered by the lack of data.

Preferably, FMEG may increase the number of training data to obtain robust models. Additionally, it also demonstrates a strong database generalization ability, enabling the generation of diverse FME samples.

On the other hand, the task of image animation is to animate the objects in the image according to desired movements. Supervised methods may use landmarks, poses, and segmentation information for animating images. For example, GANimation used anatomically consistent AUs to animate a wide range of faces in a continuous space. Self-supervised image animation methods learned the motion (optical flow) in the videos and used it to warp images for animation. In another example, X2Face utilized a dense motion to generate outputs through image warping. Yet in another example, keypoints may be used to estimate motions in an unsupervised manner, and the method was named as Monkey-Net.

Based on MonkeyNet and X2Face, other self-supervised methods were devised, i.e. the first order motion model (FOMM), which improved the performance by including the motion's first order information and achieved high-quality results. For example, a principal component analysis based method for improving the motion representation to create articulated animation (MRAA) may be used. Since FOMM performs better on face-related tasks than MRAA, FOMM may be used as the baseline method. However, FOMM does not take into consideration that most parts of the faces in FMEs are kept unchanged, and most movements appear at the edges. Thus, utilized edge maps can aid in extracting and enhancing subtle movement features.

Referring to FIG. 1, an embodiment of the present invention is illustrated. This embodiment is arranged to provide a system for image processing, comprising a facial expression extraction module arranged to, upon receiving a source sequence of images representing a predetermined facial expression performed by a sample target, extract a motion of at least one key facial feature of the sample target associated with the predetermined facial expression, and to enhance the detection of the motion including at least one subtle movement of the at least one key facial feature; and a facial expression data analyser arranged to collect facial micro-expression data associated with the predetermined facial expression and the motion including subtle movements of all key facial features of the sample target performing the predetermined facial expression.

In this example embodiment, the interface and processor are implemented by a computer having an appropriate user interface. The computer may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. The computing device may be appropriately programmed to implement the invention.

The system may be used to receive a sequence or a series of images, such as a video clip or an animated image which may show a target such as a face of a first individual, who performs a facial expression. The motion of different facial features, such as eye bow, lips, cheek and chin, may be detected and extracted by the facial expression extraction module of the system and is further processed by a facial expression data analyser so as to collect more subtle movements of these facial features, which may be further used for generating reconstruction images of a second individual who perform a similar facial expression including subtle movements by emulation, without requiring the second individual to actually perform such facial expression or FME.

As shown in FIG. 1 there is a shown a schematic diagram of a computer system or computer server 100 which is arranged to be implemented as an example embodiment of a system for image processing. In this embodiment the system comprises a server 100 which includes suitable components necessary to receive, store and execute appropriate computer instructions. The components may include a processing unit 102, including Central Processing United (CPUs), Math Co-Processing Unit (Math Processor), Graphic Processing United (GPUs) or Tensor processing united (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100.

The computer or computing apparatus may also provide the necessary computational capabilities to operate or to interface with a machine learning network, such as neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
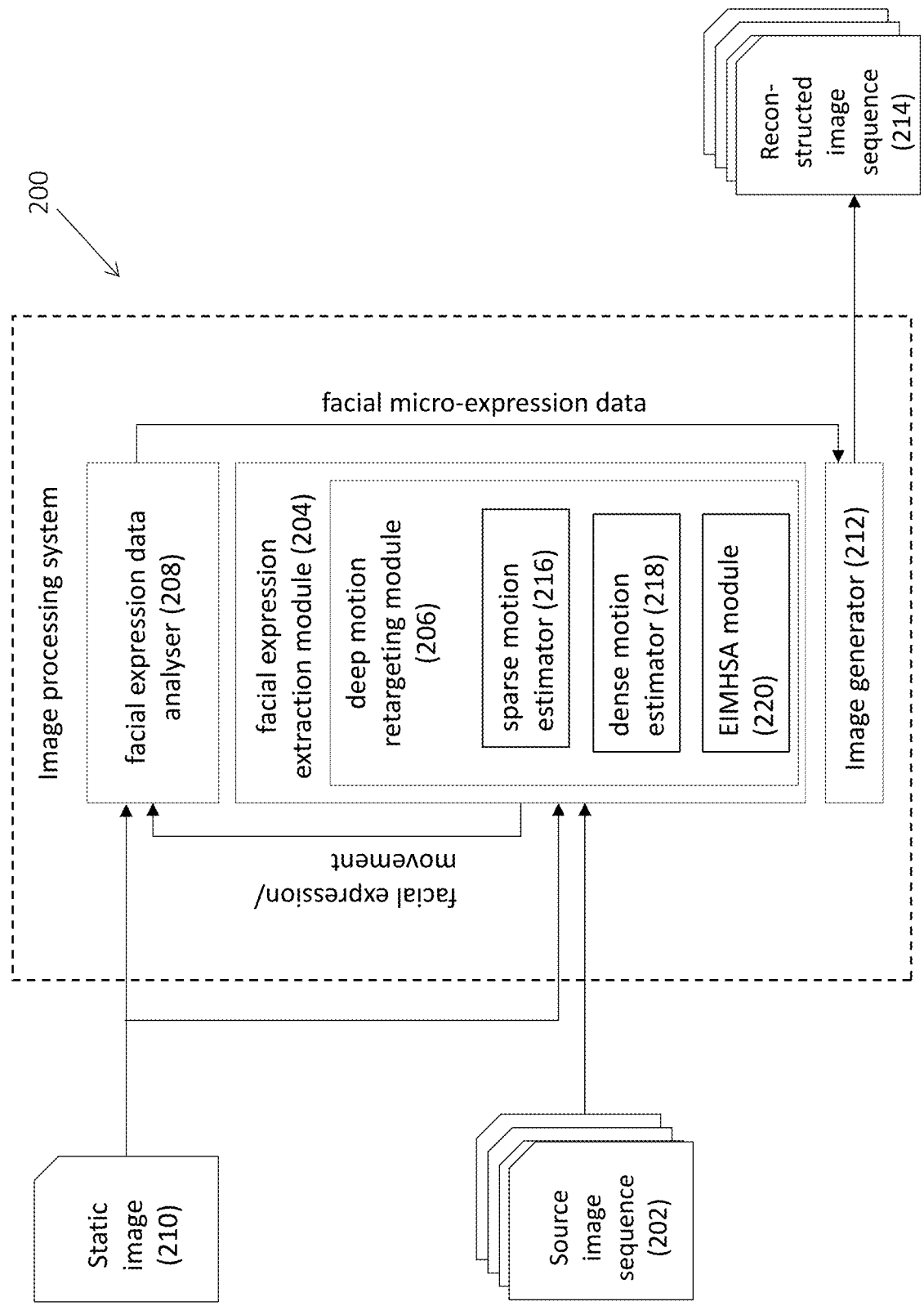
FIG. 2 is a block diagram showing a system for processing an image in accordance with an embodiment of the present invention.

With reference to FIG. 2, there is shown an embodiment of the system 200 for processing an image. In this embodiment, the server 100 is used as part of a system 200 as arranged to receive a source sequence of image 202 representing a predetermined facial expression performed by a sample target, such as a human being who perform a facial expression. As described earlier, facial expression as shown in a face involves movement of facial features, in particular key facial features such as the eyes, the lips, the cheek and the chin, from their respective "original" position when no special expressions are performed to one or more predetermined expressions identified by the system 200.

In this example, the system 200 comprises a facial expression extraction module 204 arranged to extract a motion of each of key facial features of the sample target associated with the predetermined facial expression. For example, when the sample target smiles, the motions of the lips/mouth, the cheek and the eyes may be captured and extracted by the facial expression extraction module 204. By analyzing movements of these facial features, the relationship between the motions of the facial features and the associated expressions may be obtained.

Preferably, the facial expression extraction module 204 is further arranged to enhance the detection of the motion including at least one subtle movement of the at least one key facial feature. As described earlier, FME may involve only subtle movement of the facial features, in both the time domain (i.e. short period of time) and the spatial domain (i.e. small displacement/movement). Preferably, the facial expression extraction module 204 may perform an auxiliary task for predicting edges of the key facial feature in one or more moving regions on the face of the sample target, by generating an edge map associated for estimating facial edges to aid the detection of the at least one subtle movement.

Preferably, the facial expression extraction module 204 may comprise a deep motion retargeting module 206 which may be implemented as a neural network processing engine, and preferably, an unsupervised neural network, for processing the source sequence of images to extract the motion of the key facial features of the sample target. Details of the operation of the edge prediction method will be described later in this disclosure.

In addition, the system 200 further comprises a facial expression data analyser 208 for collecting facial micro-expression data associated with the predetermined facial expression and the motion including subtle movements of all key facial features of the sample target performing the predetermined facial expression, as extracted/detected by the facial expression extraction module 204. The collected micro-expression data may include the displacement and speed related to the movement of different facial features when certain facial expression or FME is performed, based on the image frames in each of the source sequence of image 202 provided to the system. These data may be obtained when incremental changes of the facial features are detected by comparing multiple image pairs in the image sequence.

Preferably, the collected facial micro-expression data may be used for image construction or reconstruction of another target individual, by incorporating the collected micro-expression data in a static image 210 of another target/individual. Preferably, the system 200 may also comprise an image generator 212 for generating, based on the facial micro-expression data collected from the source sequence of images 202, a reconstructed sequence of images 214 of the target representing the target performing the same facial expression, for example, a short video clip showing that the target smiles with facial features moving with similar displacement and speed as those extracted from the sample target.

Additionally, as facial micro-expression data associated with subtle movements of the facial features are also extracted and collected, the image generator 212 may also reconstruct images to emulate FME perform on by the target, for example, FME which may be shown on a face when one is lying, or being confused.

Figure 3:
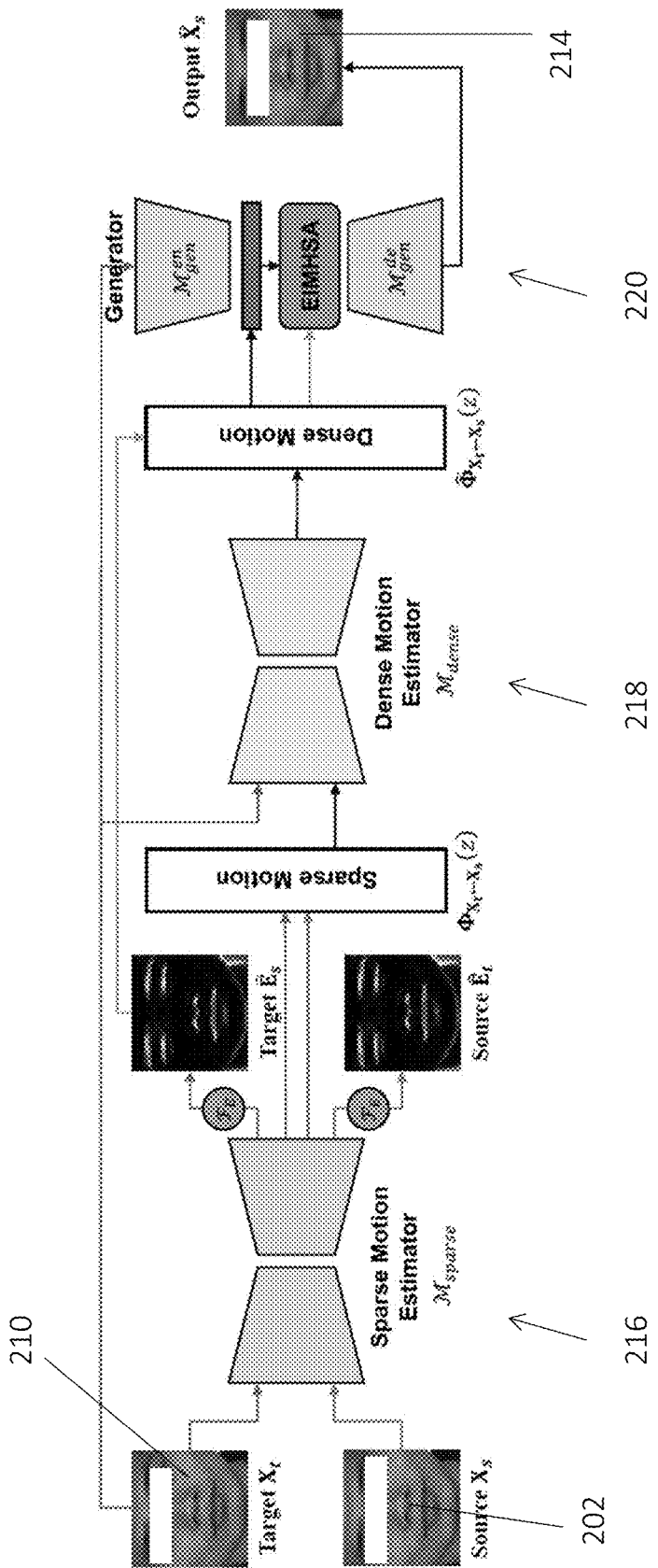
FIG. 3 is a schematic diagram showing the pipeline of the EAM-FMEG method during training.

Preferably, given a source facial sequence $X=\{X_1, \ldots, X_L\}$ containing a designated FME and a static target facial image Y, the objective of FMEG is to generate a facial sequence $\hat{Y}=\{\hat{Y}_1, \ldots, \hat{Y}_L\}$, which has the same FME as the corresponding X. For example, referring to FIG. 3, an EAM-FMEG method may be used to generate FME images. The model is made up of three parts: a deep motion retargeting (DMR) module that extracts motion and generates desired images, an AEP task for improving the feature extraction of subtle movement, and an Edge-Intensified Multi-head Self-Attention (EIMHSA) module 220 to enhance the image generation of important regions.

In this example, the DMR network consists of a sparse motion estimator, a dense motion estimator, and a generator. The AEP module predicts the edges of the inputs. The EIMHSA focuses on important regions based on the information from the warped image representation and warped predicted edge. During testing, the target, source, and output frames should be replaced as Y, $X_\tau$, and $\hat{Y}_\tau$.

To capture subtle variations, a DMR model $\mathcal{M}$ can learn keypoints in an unsupervised manner, estimate motions, and generate images in a self-supervised manner. The model includes a sparse motion estimator $\mathcal{M}_{sparse}$, a dense motion estimator $\mathcal{M}_{dense}$, and an image generator $\approx_{gen}$. During training, the model just requires a single sequence X, and selects one target frame $X_t$ and one source frame $X_s$ from the sequence at each time. Then, the model $\mathcal{M}$ attempts to reconstruct $\hat{X}_s$ by using the target frame and the estimated motion between the target and source frames.

Preferably, the deep motion retargeting module 206 may comprise a sparse motion estimator 216 arranged to estimate a sparse motion from a selected source frame to a selected target frame by combining a first sparse motion from the selected source frame to an abstract reference frame and a second sparse motion from the abstract reference frame to the selected target frame, wherein the abstract reference frame includes a plurality of keypoints.

By assuming an abstract reference frame $X_r$ exists, the motion $\Phi_{X_t \leftarrow X_r}$ and $\Phi_{X_s \leftarrow X_r}$ can be estimated independently. If K keypoints exist in the reference frame $X_r$, the first order Taylor expansion around the k th point $p_k$ can be represented as:

$$\Phi_{X_t \leftarrow X_r}(p) \approx \Phi_{X_t \leftarrow X_r}(p_k) + \left(\frac{d}{dp}\Phi_{X_t \leftarrow X_r}(p)|_{p=p_k}\right)(p - p_k), \quad (1)$$

where $\Phi_{X_t \leftarrow X_r}(p_k)$ indicates the zero order of the motion, and $$\left(\frac{d}{dp}\Phi_{X_t \leftarrow X_r}(p)|_{p=p_k}\right)(p - p_k)$$

stands for the first order of the motion at point $p_k(k \in \{1, \ldots, K\})$. An hourglass keypoint estimation network is used to predicate all these motion parameters.

The sparse motion $\Phi_{X_t \leftarrow X_s}$ from $X_s$ to $X_t$ can be calculated by combining $\Phi_{X_t \leftarrow X_r}$ and $_{X_s \leftarrow X_r}$, and using the first order Taylor expansion introduced in (1) as $$\Phi_{X_t \leftarrow X_s}(z) = \Phi_{X_t \leftarrow X_r} \circ \Phi_{X_r \leftarrow X_s}(z) = \Phi_{X_t \leftarrow X_r} \circ \Phi^{-1}_{X_s \leftarrow X_r}(z) \quad (2)$$

$$\approx \Phi_{X_t \leftarrow X_r}(p_k) + J_k \cdot (z - \Phi_{X_s \leftarrow X_r}(p_k)), \quad (3)$$

where $$J_k = \left(\frac{d}{dp}\Phi_{X_t \leftarrow X_r}(p)|_{p=p_k}\right)\left(\frac{d}{dp}\Phi_{X_s \leftarrow X_r}(p)|_{p=p_k}\right)^{-1}.$$

Preferably, the deep motion retargeting module 206 may further comprise a dense motion estimator 218 arranged estimate a dense motion from the selected source frame to the selected target frame represented by a linear combination of sparse motion weighted by masks indicating places of transformation of each of the keypoints.

Since the sparse motion is aligned with $X_s$ but not $X_t$, $X_t$ cannot be directly used for dense motion estimation. Therefore, the target frame $X_t$ is warped by bilinear sampling $\Delta_w$ based on $\chi_{t \leftarrow X_s}$ to obtain K deformed frames $X_t^1, \ldots, X_t^K$ as $$X_t^0, \ldots, X_t^K = [X_t^0, \Delta_w([X_t, \ldots, X_t], \Phi_{X_t \leftarrow X_s}(z))], \quad (4)$$

where $X_t^0$ is an additional background indicator. To highlight the change around each location, the k th difference of Gaussian (DoG) heatmap $H_k$ between the source and target keypoints can be computed as:

$$H_k(z) = \exp\left(\frac{(\Phi_{X_s \leftarrow X_r}(p_k) - z)^2}{\sigma}\right) - \exp\left(\frac{(\Phi_{X_t \leftarrow X_r}(p_k) - z)^2}{\sigma}\right). \quad (5)$$

The deformed frames $X_t^0, \ldots, X_t^K$ and heatmaps $H_k$ are concatenated and passed to another hourglass network. The output of the network goes through a 2D convolution to generate the masks $\psi_k$ to indicate the place for each transformation. Finally, the dense motion $\hat{\Phi}_{X_t \leftarrow X_s}(z)$ can be obtained as a linear combination of sparse motion weighted by the masks $\psi_k$ as:

$$\hat{\Phi}_{X_t \leftarrow X_s}(z) = \psi_0 z + \Sigma_{k=1}^K \psi_k (\Phi_{X_t \leftarrow X_r}(p_k) + J_k \cdot (z - \Phi_{X_s \leftarrow X_r}(p_k))). \quad (6)$$

Preferably, the image generator may generate a warped image representation associated with the reconstructed sequence of images, by multiplying an occlusion map indicating places to be inpainted to the dense motion. In this example, the deep motion retargeting module may enhance the warped image representation using an edge-intensified multi-head self-attention module, by utilizing warped predicted edge information as a query signal to search edge associated attention weights, and then the image generator may further generate the reconstructed sequence of images by focusing on important facial regions associated with the warped predicted edge information to reflect subtle changes of the key facial features.

Since some parts in the source $X_s$ may not appear in the target $X_t$, the dense motion network also needs to generate an occlusion map $\hat{\Omega}$ to indicate the places to be inpainted. The target image representation is obtained by passing the target $X_t$ through an encoder $\mathcal{M}_{gen}^{en}(X_t)$. Then, a warping operation $\Delta_w$ with the dense motion $\hat{\Phi}_{X_t \leftarrow X_s}$ is performed to obtain the transformed image representation. This representation multiplies with the occlusion map $\hat{\Omega}$ element wisely to obtain warped image representation $\bar{\Gamma}$ as:

$$\bar{\Gamma} = \hat{\Omega} \odot \Delta_w(\mathcal{M}_{gen}^{en}(X_t), \hat{\Phi}_{X_t \leftarrow X_s}(z)). \quad (7)$$

Then, the representation $\bar{\Gamma}$ is enhanced by EIMHSA module (as described later in this disclosure), Finally, the enhanced image representation $\hat{\Gamma}$ is sent to the generator's decoder to reconstruct the image as:

$$\hat{X}_s = \mathcal{M}_{gen}^{de}(\hat{\Gamma}). \quad (8)$$

To improve the feature extraction of subtle movement, it is important to improve the motion estimation. Inspired by a recent work using the histogram of gradient feature map as the self-supervised learning objective, and the work using Gaussian heatmap regression as an auxiliary task for learning discriminating features, an auxiliary task, for example an Auxiliary Edge Prediction (AEP) Task, may be included for predicting edges at the same time of estimating motion.

An extended DoG (XDoG) operator may be employed to generate the desired edge maps. The operator extends the DoG filter with a variable threshold. In short, the XDoG operator can be written as $$D_E(\sigma_E, k_E, \tau_E) = G_E(\sigma_E) - \tau_E \cdot G_E(k_E \cdot \sigma_E), \quad (9)$$

$$\bar{E}(\sigma_E, k_E, \tau_E, \epsilon_E, \varphi_E) = \begin{cases} 1, & D_E(\sigma_E, k_E, \tau_E) < \epsilon_E \\ 1 + \tanh(\varphi_E(D_E(\sigma_E, k_E, \tau_E)), & \text{otherwise}, \end{cases} \quad (10)$$

where $G_E$ is the output of the image after applying a Gaussian filter with variance $\sigma_E$, $k_E$ is a scaling factor, $\tau_E$ changes the relative weighting between the two Gaussians, $\epsilon_E$ shifts the detection threshold, and $\varphi_E$ controls the steepness of the tanh function. The network may learn to predict these edge maps instead of using the edge map as input signals. The final ground truth edge map E is created by inverting the values of $\bar{E}$. In detail, denoting the output of the sparse motion module's hourglass network (before computing the keypoints and Jacobians) as $\Xi_i (i \in \{t, s\})$. The dimension of $\Xi_i$ may be reduced to one by using a 2D convolution $\mathcal{F}_E$ followed by a sigmoid function to predict gray-scale edge maps as:

$$\hat{E}_i = \text{sigmoid}(\mathcal{F}_E(\Xi_i)). \quad (11)$$

A pixel-wise regression task may be alternatively formed to reconstruct the edge.

Figure 4:
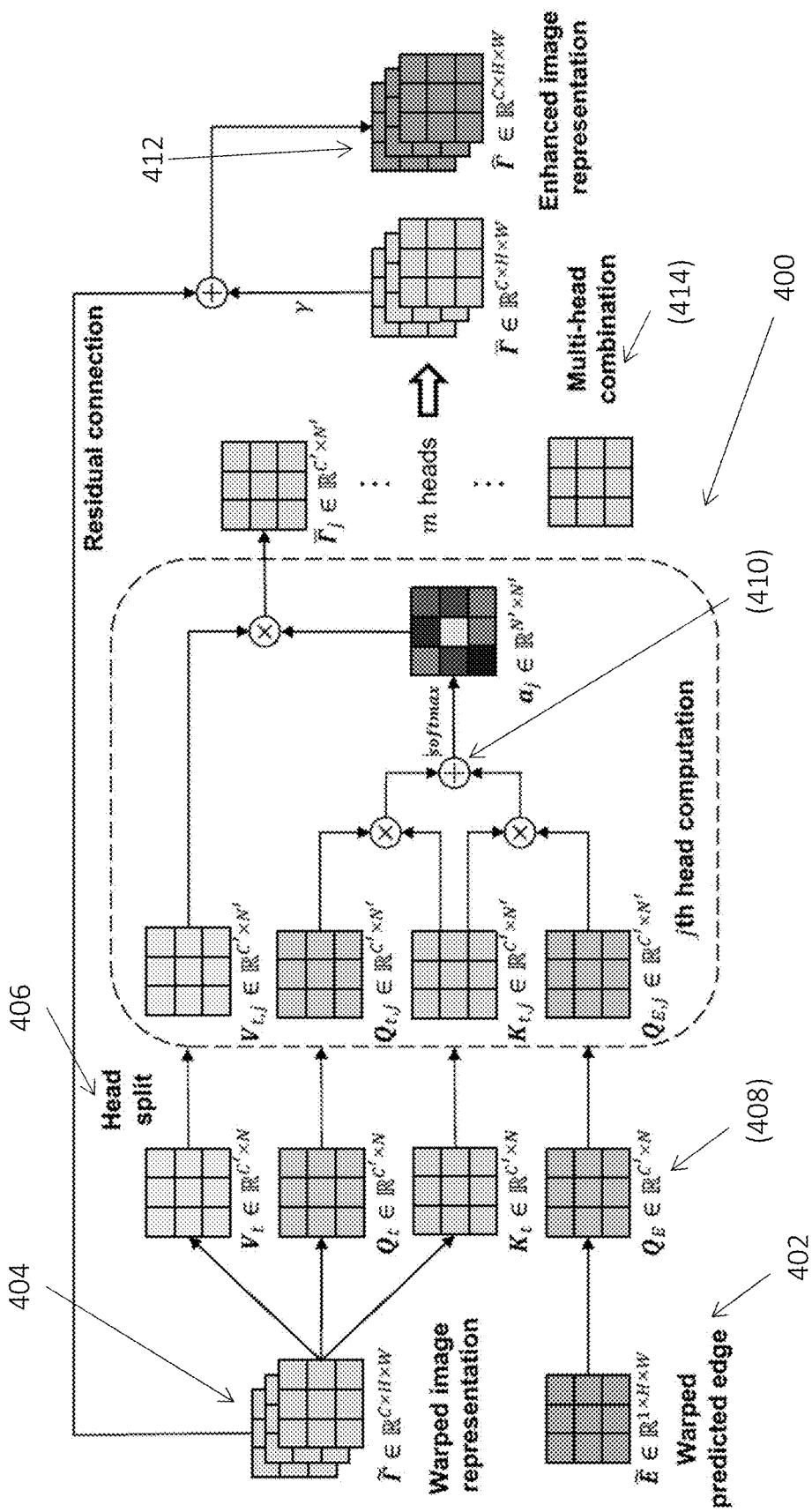
FIG. 4 is a graphical illustration of the EIMHSA module.

With reference to FIG. 4, to improve the fine-grained details around moving regions, which usually contain edges, the image generator may be guided by focusing on edge associated and self-learned important regions via the Edge-Intensified Multi-head Self-Attention (EIMHSA) module 400. First, the warped predicted edge 402 may be utilized as a query signal to search edge-associated attention weights. Then, the self-attention (SA) module may be extended to a multi-head version 406, because the single-head SA would be too sparse and can only focus on a few locations, denoting $\hat{E}_t$ as $\hat{E}$, because the EIMHSA only requires the predicted edge map $\hat{E}_t$ from the target frame.

The warped image representation 404 $\bar{\Gamma}$, and the warped predicted edge 402 $\tilde{E}$ are projected (408) to the queries $Q_r$, $Q_E$, key $K_r$, and value $V_r$. The computation of attention is done in a multi-head manner with m heads. For each head, the attention score a $a_j$ is obtained by passing the summation of a self-similarity score $s_{t,j}$ and an edge-similarity score $s_{E,j}$ through a softmax operation (410). The final enhanced image representation 412 $\hat{\Gamma}$ is obtained by a residual connection of the combined multi-head attentional (414) output $\Gamma$ and the input $\bar{\Gamma}$ with a learnable scaling parameter $\gamma$.

The predicted edge $\hat{E}$ may not align with the warped image. Thus, it may be wrapped by applying the dense motion as $$\tilde{E} = \Delta_w(\hat{E}, \hat{\Phi}_{X_t \leftarrow X_s}(z)). \quad (12)$$

Therefore, the inputs to the EIMHSA module are the warped image representation $\bar{\Gamma} \in \mathbb{R}^{C \times H \times W}$, and the warped predicted edge $\tilde{E} \in \mathbb{R}^{H \times W}$, where C is the number of channels, and H and W are the feature's height and width. First, individual convolutions are applied on $\bar{\Gamma}$ to generate the query $Q_r \in \mathbb{R}^{C' \times N}$, key $K_r \in \mathbb{R}^{C' \times N}$ and value $V_r \in \mathbb{R}^{C' \times N}$ of the warped image representation. C' is the number of the output channel dimension, which is smaller than C for reducing the computation, and N=H×W. Meanwhile, an edge query $Q_E \in \mathbb{R}^{C' \times N}$ is obtained in a similar way. The quantities mentioned above are split into m heads to generate dense attention. For each head, the matrices can be viewed as queries $Q_{t,j} \in \mathbb{R}^{C \times N'}$, key $Q_{E,j} \in \mathbb{R}^{C \times N'}$, key $K_{t,j} \in \mathbb{R}^{C \times N'}$, and value $V_{t,j} \in \mathbb{R}^{C \times N'}$, where N'=N/m, $j \in \{1, \ldots, m\}$. Then, a self-similarity score $s_t$ and an edgesimilarity score $s_E$ are computed as:

$$s_{t,j} = Q_{t,j}{}^{\tau} K_{t,j} \in \mathbb{R}^{N' \times N'}, \quad (13)$$

$$s_{E,j} = Q_{E,j}{}^{\tau} K_{t,j} \in \mathbb{R}^{N' \times N'}. \quad (14)$$

Then, the attention score $a_j$ can be computed by passing through a softmax along the last dimension of the added selfsimilarity and edge-similarity scores as:

$$a_j = \text{softmax}(s_{t,j} + s_{E,j}) \in \mathbb{R}^{N' \times N'}. \quad (15)$$

The attention scores are used to compute the output $\tilde{\Gamma}_j$ as:

$$\tilde{\Gamma}_j = V_{t,j}{}^{\tau} a_j \mathbb{R}^{C' \times N'}. \quad (16)$$

All m heads' outputs are combined as $[\tilde{\Gamma}_1, \ldots, \tilde{\Gamma}_j, \ldots, \tilde{\Gamma}_m]$ and reshaped back as $\tilde{\Gamma} \mathbb{R}^{C \times H \times W}$. In addition, a residual connection is created to reserve the input information, and the final enhanced image representation is computed as:

$$\hat{\Gamma} = \gamma \tilde{\Gamma} + \tilde{\Gamma} \in \mathbb{R}^{C \times H \times W}, \quad (17)$$

where $\gamma$ is a learnable scaling parameter.

The loss functions used for training are a reconstruction loss, equivariance losses, and an edge loss. The reconstruction loss is implemented inspired by perception loss, where a VGG-19 network is used to extract features as:

$$\mathcal{L}_{rec}^{c,m}(\hat{X}_s, X_s) = \frac{1}{N_m^c} |VGG_m^c(\hat{X}_s) - VGG_m^c(X_s)|, \quad (18)$$

where $m \in (1, \ldots, 5)$ refers to the m th feature map from VGG19, and $c \in (1, \ldots, 4)$ is the cth input scale used for the VGG-19 network including 256×256, 128×128, 64×64, and 32×32, and $N_m^c$ is the total number of pixels in the cth scale and mth feature map.

The equivariance loss consists of a point and a Jacobin equivariance constrain part. Let the image go through a spatial deformation $\Phi_{X_i \leftarrow X_j}$. Based on the equivariance constraints on $X_i$, the equivariance point and Jacobin loss can be calculated as:

$$\mathcal{L}_{equiv}^{point} = \Phi_{X_i \leftarrow X_r}(p_k) - \Phi_{X_i \leftarrow X_j} \circ \Phi_{X_j \leftarrow X_r}(p_k), \quad (19)$$

$$\mathcal{L}_{equiv}^{Jacob} = \mathbb{1} - \left(\frac{d}{dp}\Phi_{X_i \leftarrow X_r}(p)\,|_{p=p_k}\right) \cdot \left(\frac{d}{dp}\Phi_{X_i \leftarrow X_j}(p)\,|_{p=\Phi_{X_j-X_r}(p_k)}\right) \quad (20)$$

$$\left(\frac{d}{dp}\Phi_{X_j \leftarrow X_r}(p)\,|_{p=p_k}\right).$$

The edge loss is a mean squared error loss between the ground truth and predicted edge map as $$\mathcal{L}_{edge} = \frac{1}{2}\sum_i (E_i - \hat{E}_i)^2. \quad (21)$$

The final loss is a weighted sum by $\alpha$ as $$\mathcal{L} = \sum_c \sum_m (\alpha_r^{c,m} \mathcal{L}_{rec}^{c,m}) + \alpha_{eq}^p \mathcal{L}_{equiv}^{point} + \alpha_{eq}^J \mathcal{L}_{equiv}^{Jacob} + \alpha_{ed} \mathcal{L}_{edge}. \quad (22)$$

When a new image $\hat{Y}_\tau$ is generated, a relative motion $\Phi_{X_1 \leftarrow X_\tau}$ is first obtained, rather than applying the direct transformation $\Phi_{Y \leftarrow X_\tau}$ from source to target. Then, $\Phi_{Y \leftarrow \hat{Y}_\tau}$ is generated as $$\Phi_{Y \leftarrow \hat{Y}_\tau}(z) \approx \Phi_{Y \leftarrow Y_r}(p_k) + J_k' \cdot \left(z - \Phi_{Y \leftarrow Y_r}(p_k) + \Phi_{X_1 \leftarrow Y_r}(p_k) - \Phi_{X_\tau \leftarrow Y_r}(p)\right) \quad (23)$$

where $$J_k' = \left(\frac{d}{dp}\Phi_{X_1 \leftarrow X_r}(p)\,|_{p=p_k}\right)\left(\frac{d}{dp}\Phi_{X_\tau \leftarrow X_r}(p)\,|_{p=p_k}\right)^{-1}.$$

The present invention was tested and evaluated using different training set/database. CASME II dataset contains 26 subjects and 255 FME sequences. All videos were shot at 200 frames per second (FPS) with a resolution of 640×480. In particular, cropped images were used by resizing them to 256×256.

SMIC-HS dataset comprises 164 spontaneous FME clips from 16 participants, recorded at 100 FPS with high-speed cameras. These clips are divided into three classes: positive, negative, and surprise. In particular, cropped images were used by resizing them to 256×256.

SAMM dataset has 159 FMEs. The micro-movements interval is from the onset frame to the offset frame, with all labeled micro-expressions and micro-movements. In particular, cropping faces using OpenCV Viola Joins face detector to 256×256 aligned with the first frame were used.

An example system was built using the PyTorch deep learning framework. An adaptive moment (Adam) optimizer with an initial learning rate of $2 \times 10^{-4}$ for 50 epochs of training was used. A multistep learning rate scheduler was used to dynamically reduce the learning rate at the epochs 20 and 40 by a factor of 10. For losses, all hyperparameters were set to 10. Gaussian $\sigma$ had a variance of 0.01. Random time, horizontal flips, and color jitter were utilized for data augmentation. A high-performance computing center was employed to train the system, using 1 NVIDIA V100 GPU with 32 GB memory and 4 CPU cores.

In the experiment, for each database, 3 sequences with positive, negative, and surprise expressions were defined as source samples. One Asian female face from CASME and one Western male face from SMIC-VIS were specified as target faces.

The emotions from each source sequence should be generated on target faces. In total, there are 18 videos, i.e. 2 templates×3 emotions for 3 databases. All videos are unified at 100 FPS, with a resolution of 256×256.

Figure 5:
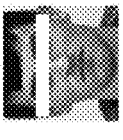
FIG. 5 are images demonstrating qualitative result on CASME II, SMIC, and SAMM with images around the apex frame.

With reference to FIG. 5, to demonstrate the result qualitatively, some frames around the FME apex frame were selected, since the ground truth apex frames of testing videos are not available. In particular, CASME II (502) and SMIC (504) results were obtained by the model trained from themselves in the Figure.

According to the challenge guideline, three experts who hold facial action coding system (FACS) certificates from the UK, Finland, and China were invited to perform the evaluation based on the quality and AUs independently. The scores for each part range from 0 (completely incorrect) to 3 (excellent), with a maximum score of 54 for each database. As an extension work of the deep motion retargeting and transfer learning based FMEG (DMTFMEG), which has a similar performance. The examples are compared with the present invention: facial prior based first order motion model (FP-FOMM), fine-grained AUs modulation based generative adversarial network (FAMGAN) as shown in the following table. In particular, the present invention has a similar AU retargeting performance with more fine-grained details as the proxy work. In addition, the defects on SMIC and SAMM in are eliminated.

| Method | Expert 1 | Expert 2 | Expert 3 | Overall |
|---|---|---|---|---|
| FP-FOMM | 139 | 101 | 76 | 316(2.94) |
| DMT-FMEG | 140 | 107 | 56 | 303(2.74) |
| FAMGAN | 104 | 66 | 66 | 236(2.23) |

The overall score is presented as the raw score (normalized score). The DMT-FMEG's performance is used as a proxy.

Advantageously, the method used in the present invention also demonstrated strong cross-database generalization ability. FME videos with the model trained on another database were generated to validate the finding. For example, the model trained on CASME II was used to generate FMEs using the source sample sequences of SMIC and SAMM. With reference to FIG. 5, the results with the SAMM source images as inputs were generated by the model trained on CASME II. In general, the models trained on RGB databases, CASME II and SMIC, can generate satisfactory FME videos using the grayscale source sample sequences from SAMM or vice versa. In some cases, an improved performance may be observed using the model trained on other databases. All possible cross-database training and testing pairs were shown.

With reference to FIG. 6, some ablation studies were performed to demonstrate the advancement of the present invention with edge awareness. The results obtained by the method were qualitatively compared with AEP and EIMHSA modules, and those from the method without these modules from. First, it may be observed that clear edges of the moving object may be observed as shown in the first row 602 in FIG. 6. Moreover, undesired texture on the nose (the second row 604), shape distortion, or background defects (the third row 606) are not observed.

In addition to the qualitative result, some quantitative results showing the usefulness of edge awareness are demonstrated in the following table. The two loss values are used as indicators for evaluation during the reconstruction training: $\mathcal{L}_{recon}$ can demonstrate reconstruction quality, whereas $\mathcal{L}_{equiv}^{point}$ can indicate the consensus of the keypoints after warping. A large decrease in the reconstruction loss by adding the AEP task may be observed. Then, a further decrease can be seen in the $\mathcal{L}_{equiv}^{point}$ from 0.061 to 0.056 by adding the EIMHSA module.

| Module | | | |
|---|---|---|---|
| AEP | EIMHSA | $\mathcal{L}_{recon}\downarrow$ | $\mathcal{L}_{equiv}^{point}\downarrow$ |
| x | x | 36.12 | 0.064 |
| ✓ | x | 32.67 | 0.061 |
| ✓ | ✓ | 32.30 | 0.056 |

($\downarrow$ the lower the better).

These embodiments may be advantageous in that, an effective EAM-FMEG method for generating FME images is provided. First, it is shown that the EMA-FMEG method can capture subtle variations and generate new FME images effectively. Second, edge information can help preserve some key information during the FMEG. Effective results were demonstrated on CASME II, SM IC, and SAMM databases. Furthermore, the method demonstrated strong cross-database generalization ability, even from RGB to grayscale images or vice versa, enabling general applications. In addition, high-quality FME images may be generated by combining the generation ability of motion and AU based methods.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include tablet computers, wearable devices, smart phones, Internet of Things (IoT) devices, edge computing devices, stand alone computers, network computers, cloud based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for image processing, comprising:
   a facial expression extraction module arranged to, upon receiving a source sequence of images representing a predetermined facial expression performed by a sample target, extract a motion of at least one key facial feature of the sample target associated with the predetermined facial expression, and to enhance the detection of the motion including at least one subtle movement of the at least one key facial feature;
   a facial expression data analyser arranged to collect facial micro-expression data associated with the predetermined facial expression and the motion including subtle movements of all key facial features of the sample target performing the predetermined facial expression;
   an edge-intensified multi-head self-attention module arranged to receive as inputs a warped image representation derived from said source sequence of images and a warped predicted edge information, said edge-intensified multi-head self-attention module being arranged for focusing on edge associated and self-learned important regions based on said warped predicted edge information to produce an enhanced image representation from said warped image representation; and
   an image generator arranged to generate a reconstructed sequence of images of a target representing the target performing the predetermined facial expression using the enhanced warped image representation,
   wherein the image generator is arranged to generate the warped image representation associated with the reconstructed sequence of images, by multiplying an occlusion map indicating places to be inpainted to a dense motion.

2. The system of claim 1, wherein the facial expression extraction module is arranged to perform an auxiliary task for predicting edges of the at least one key facial feature in one or more moving regions on a face of the sample target.

3. The system of claim 2, wherein the facial expression extraction module is arranged to perform the auxiliary task for predicting edges by generating an edge map associated for estimating facial edges to aid the detection of the at least one subtle movement.

4. The system of claim 1, wherein the facial expression extraction module comprises a deep motion retargeting module arranged to process the source sequence of images to extract the motion of the at least one key facial feature of the sample target.

5. The system of claim 4, wherein the deep motion retargeting module comprises a neural network processing engine arranged to operate in an unsupervised manner.

6. The system of claim 4, wherein the deep motion retargeting module is further arranged to process the source sequence of images and a static image of the target; and the image generator is arranged to generate, based on the facial micro-expression data collected from the source sequence of images, the reconstructed sequence of images of the target representing the target performing the predetermined facial expression.

7. The system of claim 6, wherein the deep motion retargeting module comprises a sparse motion estimator arranged to estimate a sparse motion from a selected source frame to a selected target frame by combining a first sparse motion from the selected source frame to an abstract reference frame and a second sparse motion from the abstract reference frame to the selected target frame, wherein the abstract reference frame includes a plurality of keypoints.

8. The system of claim 7, wherein the deep motion retargeting module further comprises a dense motion estimator arranged to estimate the dense motion from the selected source frame to the selected target frame represented by a linear combination of sparse motion weighted by masks indicating places of transformation of each of the keypoints.

9. The system of claim 8, wherein the deep motion retargeting module is further arranged to enhance the warped image representation using the edge-intensified multi-head self-attention module, by utilizing warped predicted edge information as a query signal to search edge associated attention weights; and wherein the image generator is arranged to generate the reconstructed sequence of images by focusing on important facial regions associated with the warped predicted edge information to reflect subtle changes of the key facial features.

10. A method of facial expression detection, comprising the steps of:
receiving a source sequence of images representing a predetermined facial expression performed by a sample target;
extracting a motion of at least one key facial feature of the sample target associated
with the predetermined facial expression, including enhancing the detection of the motion including at least one subtle movement of the at least one key facial feature;
collecting facial micro-expression data associated with the predetermined facial expression and the motion including subtle movements of all key facial features of the sample target performing the predetermined facial expression;
receiving, by an edge-intensified multi-head self-attention module, inputs including a warped image representation derived from said source sequence of images and a warped predicted edge information;
producing, by the edge-intensified multi-head self-attention module, an enhanced image representation from the warped image representation by focusing on edge associated and self-learned important regions based on said warped predicted edge information;
generating a reconstructed sequence of images of a target representing the target performing the predetermined facial expression using the enhanced warped image representation; and
generating the warped image representation associated with the reconstructed sequence of images, by multiplying an occlusion map indicating places to be inpainted to a dense motion.

11. The method of claim 10, wherein the step of extracting a motion of at least one key facial feature of the sample target comprises the step of performing an auxiliary task for predicting edges of the at least one key facial feature in one or more moving regions on a face of the sample target.

12. The method of claim 11, wherein the step of performing an auxiliary task for predicting edges includes generating an edge map associated for estimating facial edges to aid the detection of the at least one subtle movement.

13. The method of claim 10, wherein the step of extracting a motion of at least one key facial feature of the sample target comprises the step of processing the source sequence of images by a deep motion retargeting module.

14. The method of claim 13, wherein the deep motion retargeting module comprising a neural network processing engine arranged to operate in an unsupervised manner.

15. The method of claim 13, further comprising the steps of:
processing the source sequence of images and a static image of the target by the deep motion retargeting module; and
generating, based on the facial micro-expression data collected from the source sequence of images, the reconstructed sequence of images of the target representing
the target performing the predetermined facial expression.

16. The method of claim 15, wherein the deep motion retargeting module comprises a sparse motion estimator arranged to estimate a sparse motion from a selected source frame to a selected target frame by combining a first sparse motion from the selected source frame to an abstract reference frame and a second sparse motion from the abstract reference frame to the selected target frame, wherein the abstract reference frame includes a plurality of keypoints.

17. The method of claim 16, wherein the deep motion retargeting module further comprises a dense motion estimator arranged to estimate the dense motion from the selected source frame to the selected target frame represented by a linear combination of sparse motion weighted by masks indicating places of transformation of each of the keypoints.

18. The method of claim 10, further comprising the step of enhancing the warped image representation using the edge-intensified multi-head self-attention module, including:

utilizing warped predicted edge information as a query signal to search edge associated attention weights; and
generating the reconstructed sequence of images by focusing on important facial regions associated with the warped predicted edge information to reflect subtle changes of the key facial features.

\* \* \* \* \*